(12) United States Patent
Azegami

(10) Patent No.: US 6,369,960 B2
(45) Date of Patent: Apr. 9, 2002

(54) SECURING DEVICE FOR LIGHT INTERCEPTION FRAME

(75) Inventor: Kazuyoshi Azegami, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/756,784

(22) Filed: Jan. 10, 2001

(30) Foreign Application Priority Data

Jan. 28, 2000 (JP) ........................................ 2000-019918

(51) Int. Cl.[7] ................................................ G02B 7/02
(52) U.S. Cl. ........................................ 359/819; 359/828
(58) Field of Search ................................ 359/819, 828, 359/193, 694, 704; 396/529

(56) References Cited

U.S. PATENT DOCUMENTS

| 5,434,714 A | | 7/1995 | Kohmoto et al. ............ 359/740 |
| 5,754,350 A | | 5/1998 | Sato ............................ 354/818 |
| 5,966,551 A | * | 10/1999 | Haraguchi et al. ............. 396/84 |
| 5,970,267 A | * | 10/1999 | Inazuka et al. .............. 396/380 |
| 6,115,197 A | * | 9/2000 | Funahashi .................... 359/826 |
| 6,195,211 B1 | * | 2/2001 | Iwasaki ....................... 359/694 |
| 6,301,060 B1 | * | 10/2001 | Watanabe et al. ............ 359/694 |

* cited by examiner

Primary Examiner—Ricky Mack
Assistant Examiner—Omar Hindi
(74) Attorney, Agent, or Firm—Greenblum & Bernstein, P.L.C.

(57) ABSTRACT

A securing device, for securing a light interception frame made of a resilient material to an end face of a lens frame, includes engagement projections and engagement surfaces provided on the peripheral surface of the lens frame, engagement legs and engagement pieces provided on the light interception frame having a light interception plate portion; wherein the light interception plate portion has an opening through which light can pass. The positional relationship between the plurality of engagement projections and the plurality of engagement legs, and the positional relationship between the plurality of engagement surfaces and the plurality of engagement pieces are such that when the engagement pieces engage with the engagement surfaces in a free state of the light interception frame, no engagement occurs, and the engagement legs are engaged by the engagement projections by elastically deforming the light interception frame.

9 Claims, 10 Drawing Sheets

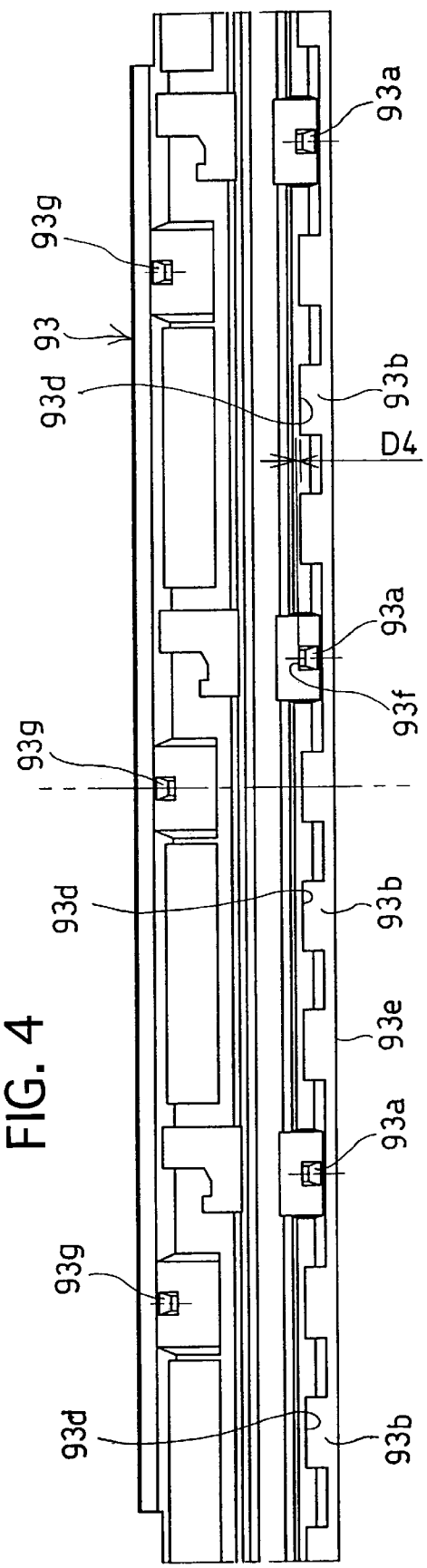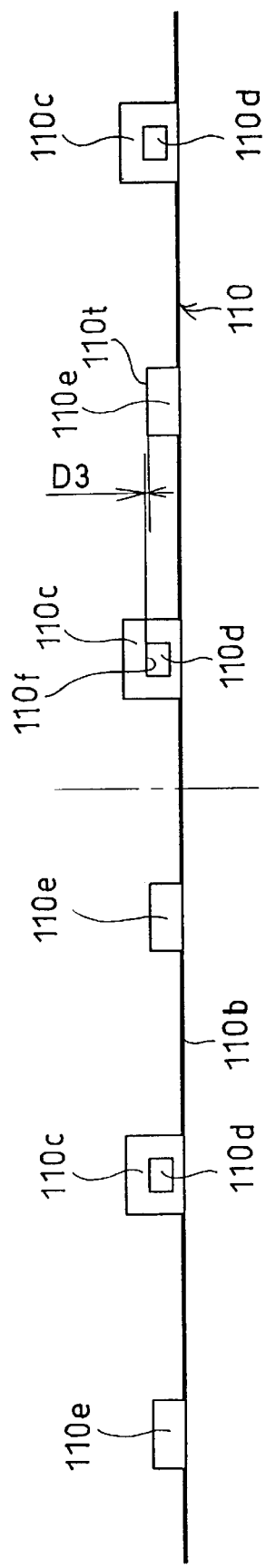
FIG. 4

SECURING DEVICE FOR LIGHT INTERCEPTION FRAME

BACKGROUND OF THE INVENTION

1. Field of the Invention

The present invention relates to a securing device for a light interception frame provided in a lens barrel.

2. Description of the Related Art

Generally, a light interception frame is provided in a lens barrel to remove extraneous light, such as stray light. Such stray light has adverse effects on the exposure of a photographic image. FIG. 11 shows, by way of example, a known light interception frame which is secured to a rear end of a lens frame which supports a predetermined lens group. In FIG. 11, lenses L10 and L20 are supported at front and rear ends of a lens support cylinder 100, and a light interception frame 200 is provided adjacent to the rear end face of the lens L20.

The lens support cylinder 100 is provided on its outer peripheral surface with a plurality of engagement pawls 101 that extend in the radial and outward direction. The light interception frame 200 is provided on its periphery with a plurality of engagement legs 201 corresponding to the engagement pawls 101, which extend in the forward direction (left direction in FIG. 11). Note that in FIG. 11, only one engagement pawl 101 and only one engagement leg 201 corresponding thereto are shown. The engagement legs 201 are each provided with an engagement hole 202, so that when the engagement pawls 101 are engaged in the corresponding engagement holes 202, the light interception frame 200 is secured to the lens support cylinder 100.

In this arrangement, it is necessary to mount the light interception frame 200 to the lens support cylinder 100 in such a way that the outer peripheral portion of a light interception plate 203 of the light interception frame 200 is in elastic contact with the end face (rear end face) 102 of the lens support cylinder 100, otherwise, the light interception frame 200 could slip off from the lens support cylinder 100. Namely, in FIG. 11, if the dimensional value D1 (distance between the light interception plate 203 and the front ends of the engagement holes 202) is identical to or greater than the dimensional value D2 (distance between the end face 102 of the lens support cylinder 100 and the front ends of the engagement holes 202), i.e., D1≧D2, the light interception frame can easily slip off. To prevent this, D1 must be smaller than D2 (D1<D2).

However, in the case where the lens L20 is fitted in and secured to the lens support cylinder 100 by thermally caulking the lens support cylinder 100 at the rear end thereof (while applying a heated metal to the lens support cylinder to thereby fuse the same), there is a possibility that the shape of the end face 102 is not identical, and thus the dimensional value D2 is irregular. In view of this possibility, it is necessary to strictly regulate (manage) the shape of the end face 102 which determines the dimensional value D2 so as to meet the requirement that D2 is always larger than D1.

SUMMARY OF THE INVENTION

It is an object of the present invention to provide a securing device for a light interception frame in which the light interception frame can always be reliably mounted to the lens frame without need of strict regulation of the dimension and shape of the portion of the lens frame to which the light interception frame is mounted.

To achieve the object of the present invention, according to the present invention, a securing device is provided for securing a light interception frame made of a resilient material to an end face of a lens frame which holds a lens. The lens frame is provided on the peripheral surface thereof with a plurality of engagement projections which extend in a direction substantially perpendicular to an optical axis of the lens, and a plurality of engagement surfaces which are located between the engagement projections and lie in a plane substantially perpendicular to the lens axis. The light interception frame includes a light interception plate portion that has an opening through which light can pass and that lies in a plane substantially perpendicular to the lens axis, a plurality of engagement legs that extend from the outer peripheral edge of the light interception plate portion and that engage with the corresponding engagement projections, and a plurality of engagement pieces that extend from the outer peripheral edge of the light interception plate portion and abut against the corresponding engagement surfaces. The positional relationship between the plurality of engagement projections and the plurality of engagement legs, and the positional relationship between the plurality of engagement surfaces and the plurality of engagement pieces are such that when the engagement pieces engage with the engagement surfaces in a free state of the light interception frame, no engagement of the engagement legs with the engagement projections occurs, and the engagement legs are engaged by the engagement projections by elastically deforming the light interception frame.

Preferably, the engagement legs are provided with engagement holes in which the corresponding engagement projections are engaged.

The lens held by the lens frame can be secured to the lens frame by thermally caulking the end face of the lens frame after the lens is fitted in the lens frame from the end face side. In such a case, the light interception frame is secured to the lens frame by the securing device, wherein the light interception plate portion is opposed to the end face of the lens frame that has been subject to the thermal caulking.

Preferably, the light interception plate portion is provided, on the end portions of the engagement legs which connect to the light interception plate portion, with cut-away portions so as to facilitate elastic deformation of the engagement legs.

According to another aspect of the present invention, a light intercepting device for a lens is provided, including a lens frame which holds a lens, the lens frame being provided on the peripheral surface thereof with a plurality of engagement projections which extend in a direction substantially perpendicular to an optical axis of the lens, and a plurality of engagement surfaces which are located between the engagement projections, the engagement surface lying in a plane substantially perpendicular to the lens axis; and a light interception frame made of a resilient material, the light interception frame being provided with a light interception plate portion that lies in a plane substantially perpendicular to the lens axis and has an opening through which light can pass, a plurality of engagement legs that extend from the outer peripheral edge of the light interception plate portion and engage with corresponding engagement projections, and a plurality of engagement pieces that extend from the outer peripheral edge of the light interception plate portion and abut against corresponding engagement surfaces. The light interception frame is secured to an end face of the lens frame so that the engagement legs are engaged by the engagement projections by elastically deforming the light interception frame when the engagement legs are engaged with the engagement projections.

Preferably, the engagement legs are provided with engagement holes in which the corresponding engagement projections are engaged.

The lens held by the lens frame can be secured to the lens frame by thermally caulking the end face of the lens frame after the lens is fitted in the lens frame from the end face side. In such a case, the light interception frame is secured to the lens frame, wherein the light interception plate portion is opposed to the end face of the lens frame that has been subject to the thermal caulking.

Preferably, the light interception plate portion is provided, on the end portions of the engagement legs which connect to the light interception plate portion, with cut-away portions so as to facilitate elastic deformation of the engagement legs.

According to another aspect of the present invention, a securing device is provided for securing a light interception frame made of a resilient material to an end face of a lens frame which holds a lens, including a plurality of engagement projections and a plurality of engagement surfaces provided on the peripheral surface of the lens frame, the plurality of engagement projections extending in a direction substantially perpendicular to an optical axis of the lens, and the plurality of engagement surfaces being located between the engagement projections and lying in a plane substantially perpendicular to the lens axis; and a plurality of engagement legs and a plurality of engagement pieces provided on the light interception frame having a light interception plate portion, the plurality of engagement legs extending from the outer peripheral edge of the light interception plate portion and engaging with corresponding engagement projections, the plurality of engagement pieces extending from the outer peripheral edge of the light interception plate portion and abutting against corresponding engagement surfaces; wherein the light interception plate portion lies in a plane substantially perpendicular to the lens axis and has an opening through which light can pass. The positional relationship between the plurality of engagement projections and the plurality of engagement legs, and the positional relationship between the plurality of engagement surfaces and the plurality of engagement pieces are such that when the engagement pieces engage with the engagement surfaces in a free state of the light interception frame, no engagement of the engagement legs with the engagement projections occurs, and the engagement legs are engaged by the engagement projections by elastically deforming the light interception frame.

The present disclosure relates to subject matter contained in Japanese Patent Application No. 2000-19918 (filed on Jan. 28, 2000) which is expressly incorporated herein by reference in its entirety.

BRIEF DESCRIPTION OF THE DRAWINGS

The invention will be discussed below in detail with reference to the accompanying drawings, in which:

FIG. 4 is a developed view of a rear lens group support cylinder and a light interception frame detached from the rear lens group support cylinder;

DESCRIPTION OF THE PREFERRED EMBODIMENT

Figure 10:
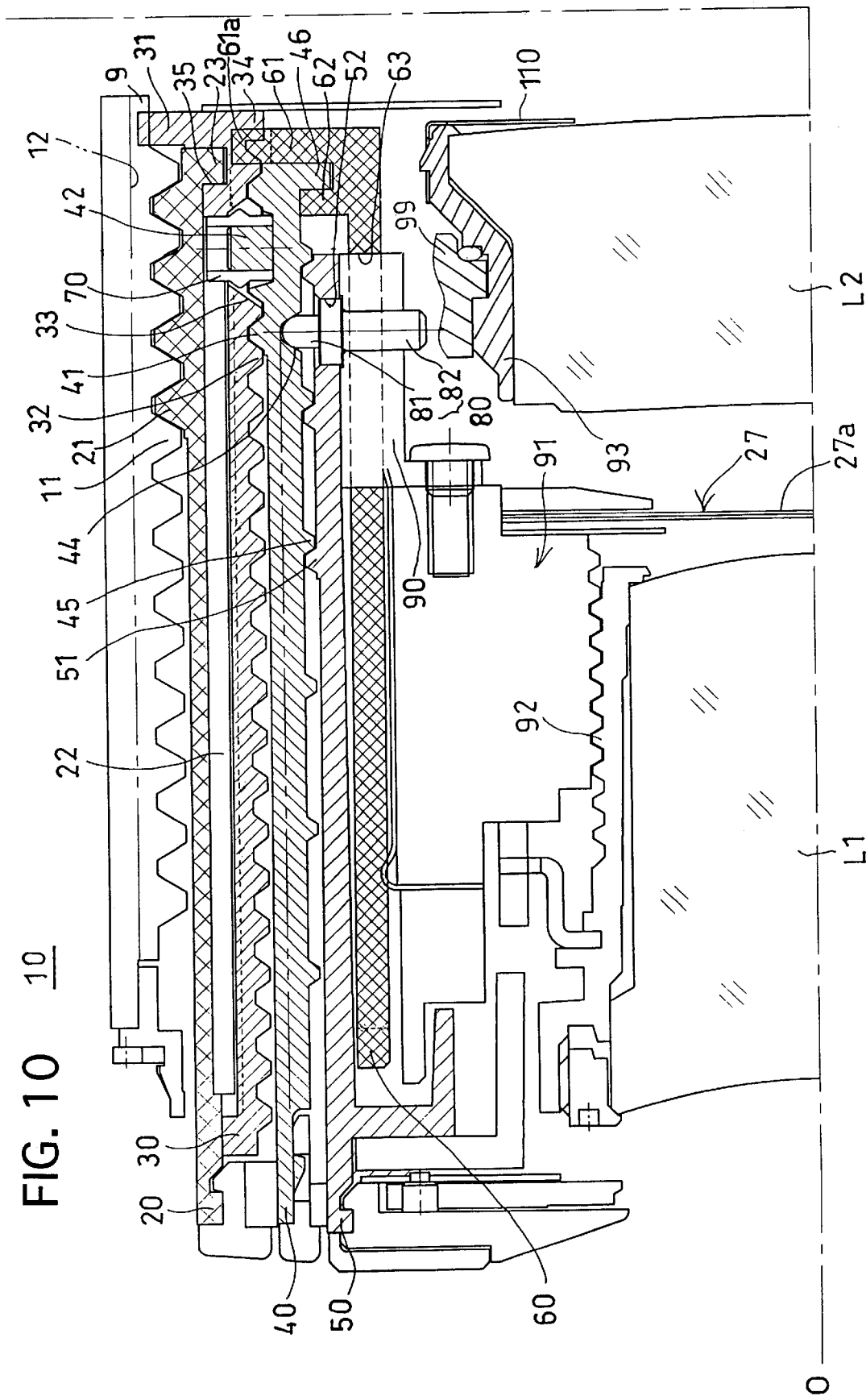
FIG. 10 is a sectional view of an upper half of a zoom lens barrel, to which the present invention is applied.
Figure 11:
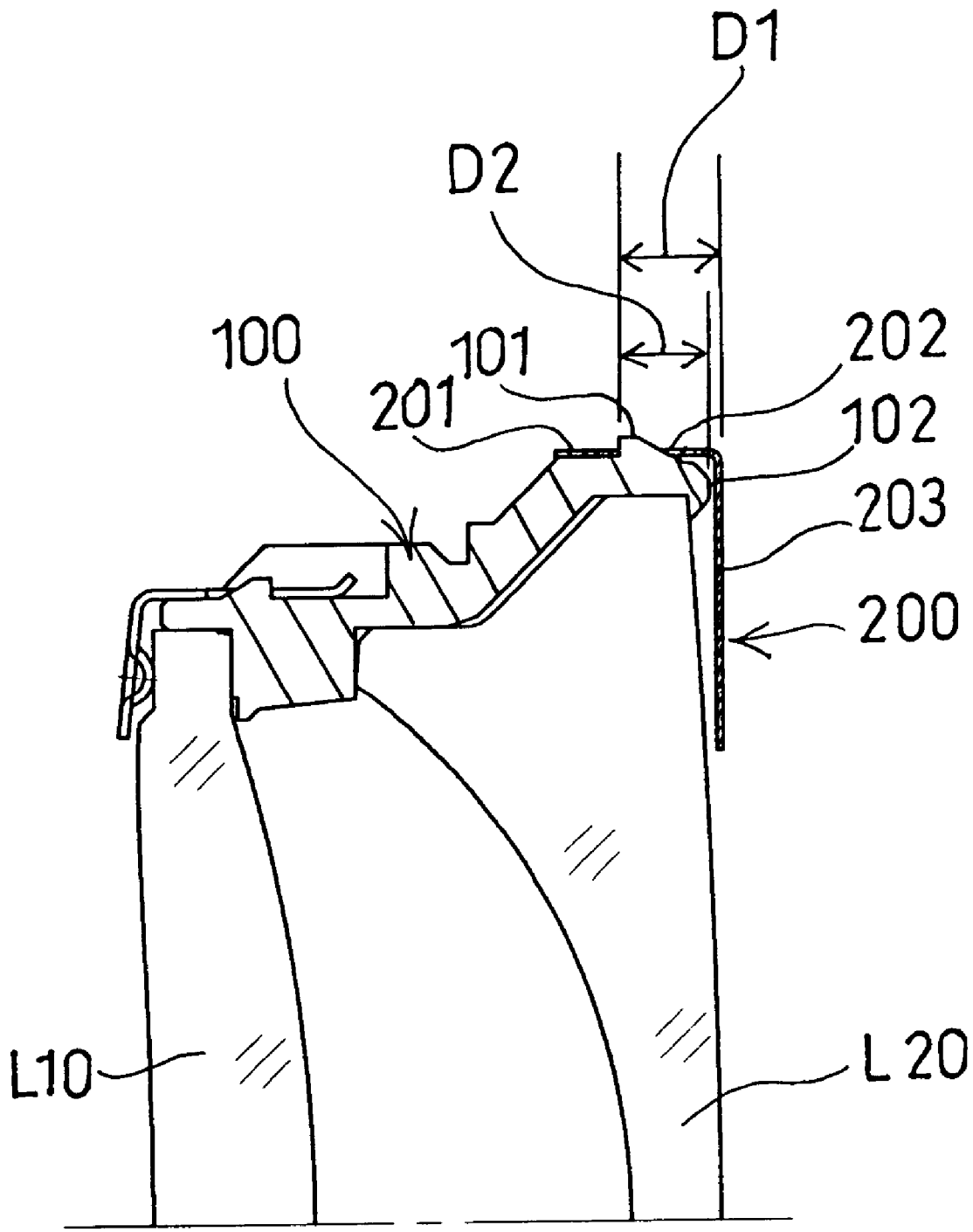
FIG. 11 is a sectional view of a known light interception frame secured to a rear end of a lens frame which supports a predetermined lens group.

FIG. 10 shows an embodiment of a zoom lens barrel to which the present invention is applied. The zoom lens barrel 10 is formed integrally with a lens shutter type camera and is a three-stage type barrel having three feed barrels.

The zoom lens barrel 10 is provided with front and rear movable lens groups, i.e., a first lens group L1 and a second lens group L2, so that the zooming operation is carried out by moving the lens groups along predetermined tracks (i.e., zoom paths) and the focusing operation is carried out by moving the first lens group L1 relative to the second lens group L2. Note that a drive mechanism for moving the second lens group L2 is not shown in the drawings, since it is not directly related to the subject of the present invention.

The zoom lens barrel 10 has a stationary ring 9 which is secured to a camera body (not shown) by means of a known securing means. The stationary ring 9 is provided on its inner peripheral surface with a female helicoid 11 and a linear movement guide groove 12 which intersects the female helicoid 11 and which extends in parallel with the optical axis O.

A male helicoid ring (first feed barrel) 20 is arranged in the stationary ring 9. The male helicoid ring 20 is provided, on the outer peripheral surface at the rear end thereof, with a male helicoid 21 which engages with the female helicoid 11 of the stationary ring 9. The male helicoid ring 20 is provided on its inner peripheral surface with an engagement groove (groove with a bottom) 22 which extends in parallel with the optical axis O. The male helicoid ring 20 is also provided on its rear end with a radially and inwardly extending projection 23.

A linear movement ring 30 is arranged in the male helicoid ring 20. The linear movement ring 30 is provided, on the outer peripheral surface at the rear end thereof with an engagement groove 35 in which the projection 23 of the male helicoid ring 20 is engaged to support the linear movement ring 30 so as to rotate relative to, and move in the optical axis direction, together with the male helicoid ring 20. The linear movement ring 30 is provided on its rear end with a radially and outwardly extending projection 31 which is slidably engaged in the linear movement guide groove 12 of the stationary ring 9. Consequently, the linear movement ring 30 can be linearly moved in the optical axis direction but cannot be rotated relative to the stationary ring 9. The linear movement ring 30 is provided on its inner peripheral surface with a female helicoid 32 and a helical groove (through groove) 33 which extends helically in parallel with the female helicoid 32.

A cam ring (second feed barrel) 40 is arranged in the linear movement ring 30. The cam ring 40 is provided, on the outer peripheral surface at the rear end thereof, with a male helicoid 41 and a radially and outwardly projecting engagement pin (radial pin) 42. The male helicoid 41 engages with the female helicoid 32 formed on the inner peripheral surface of the linear movement ring 30. A cylindrical roller 70 is fitted on the engagement pin 42, so that the engagement pin 42 and the roller 70 are slidably engaged in the engagement groove 22 of the male helicoid ring 20 through the helical groove 33. Consequently, the cam ring 40 rotates together with the male helicoid ring 20.

The cam ring 40 is provided on its inner peripheral surface with an inner helical light interception projection 45 and a cam groove 44. The cam groove 44 is formed in a space defined between the ridges (threads) of the inner helical light interception projection 45 without intersecting the inner helical light interception projection 45. The cam groove 44 does not extend through the entire thickness of the cam ring 40. The cam ring 40 is provided on its rear end with an inner flange 46.

A movable lens barrel (third feed barrel) 50 is arranged in the cam ring 40. The movable lens barrel 50 is provided, on the outer peripheral surface at the rear end thereof, with an outer helical light interception projection 51 corresponding to the inner helical light interception projection 45. The outer helical light interception projection 51 and the inner helical light interception projection 45 do not screw-engage with each other and can be brought into contact with each other without exerting force. Thus, the outer and inner helical light interception projections 51 and 45 prevent light from entering through spaces between the barrels, while ensuring smooth rotation and axial movement of the cam ring 40 and the movable lens barrel 50.

A through hole 52 is formed in the vicinity of an extension of the outer helical light interception projection 51. A guide shaft 80 is secured to the through hole 52. The guide shaft 80 supports, a first lens group holder 90 via a guide pin 82, and is provided with a cam pin 81 at the outer end. The cam pin 81 is slidably fitted in the cam groove 44.

A linear movement guide ring 60 is provided in the movable lens barrel 50 so as to move in the optical axis direction together with the cam ring 40. The linear movement guide ring 60 is provided with a flange 61. Provided on the flange 61 is a flange projection 61a which protrudes in the radial and outward direction, and is slidably fitted in the linear movement guide groove 34 of the linear movement ring 30. Consequently, the linear movement guide ring 60 is movable in the optical axis direction but is not rotatable relative to the linear movement ring 30. Also, an annular projection 62 is formed in front of the flange 61, so that the inner flange 46 is held between the flange 61 and the annular projection 62; and hence, the cam ring 40 is rotatable relative to the linear movement guide ring 60, and is movable in the optical axis direction together with the linear movement guide ring 60.

A linear movement guide slot 63 which extends in parallel with the optical axis O is formed in front of the annular projection 62. The first lens group holder 90 is slidably fitted in the linear movement guide slot 63. The first lens group L1 is located in the linear movement guide ring 60 and is held by the first lens group holder 90. Since the cam pin 81 of the guide shaft 80 is engaged in a predetermined shape of cam groove 44 formed on the cam ring 40, the first lens group holder 90 is moved in the optical axis direction in accordance with the rotation of the cam ring 40.

An AF/AE shutter unit 91 having a shutter 27 with a plurality of shutter blades 27a is fitted in and secured to the movable lens barrel 50 via the first lens group holder 90. A front lens group support ring 92 which supports the first lens group L1 is screw-engaged with the AF/AE shutter unit 91.

A rear lens group support cylinder (lens frame) 93 is supported in a holder frame 99 (only a part of which is shown in FIG. 10). A guide shaft (not shown) which extends from the holder frame 99 in the radial and outward direction is engaged in a cam groove (not shown) formed on the inner peripheral surface of the cam ring 40, in addition to the cam groove 44. The holder frame 99 is slidably fitted in an axially extending linear movement groove formed on the first lens group holder 90. Consequently, when the rotation of the cam ring 40 takes place, the second lens group L2 is moved in the optical axis direction.

In the zoom lens barrel 10 constructed as above, when the male helicoid ring 20 is rotated relative to the stationary ring 9 in the forward or reverse direction, the male helicoid ring 20 is moved in the optical axis direction, while rotating in accordance with the leads of the female helicoid 11 and the male helicoid 21. The movement of the male helicoid ring 20 causes the linear movement ring 30, which is mounted thereto so as to rotate relative to the male helicoid ring 20 and not to rotate relative to the stationary ring 9, to move in the optical axis direction without rotating. The rotation of the male helicoid ring 20 causes the roller 70 (engagement pin 42) which is engaged in the engagement groove 22 to rotate about the optical axis, so that the cam ring 40 is moved in the optical axis direction while rotating, in accordance with the leads of the female helicoid 32 and the male helicoid 41. In accordance with the movement of the cam ring 40, the linear movement guide ring 60, which is mounted so as to rotate relative to the cam ring 40 and to move in the optical axis direction together with the cam ring 40, is moved in the optical axis direction without rotating. When the movement of the linear movement guide ring 60 and the rotation of the cam ring 40 occur, the guide pin 81 of the guide shaft 80 which is guided so as to linearly move by the linear movement guide slot 63 is moved in the optical axis direction in accordance with the cam profile of the cam groove 44, so that the first lens group holder 90 secured to the guide pin 82 of the guide shaft 80 is moved in the optical axis direction. Thus, the first lens group L1 and the second lens group L2 are moved at a predetermined distance therebetween to vary the focal length.

Figure 7:
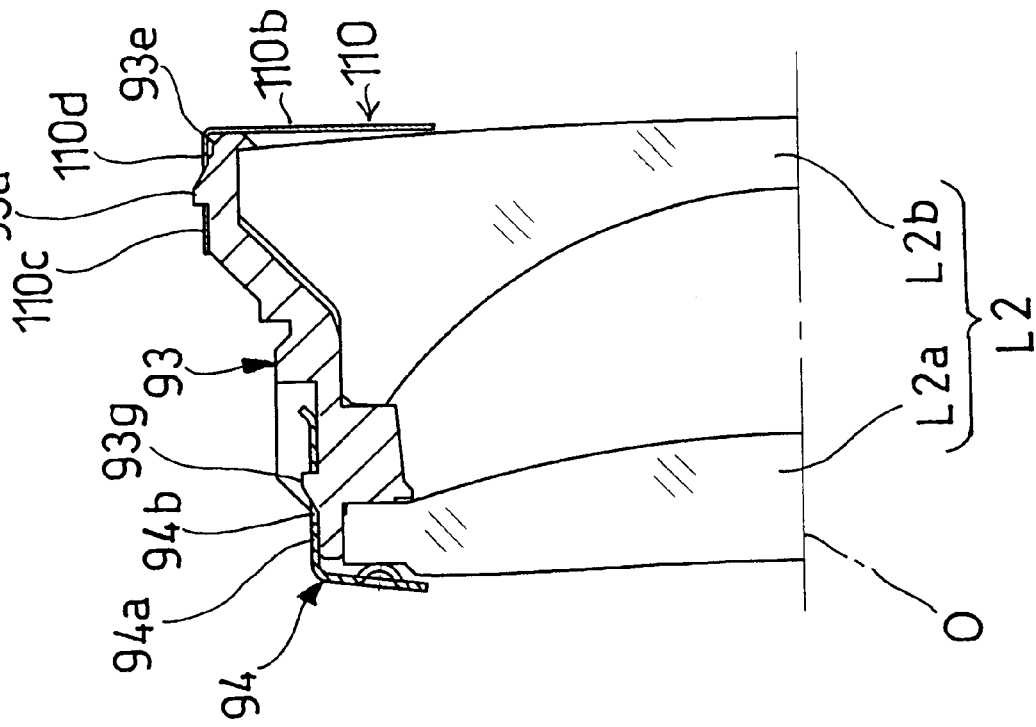
FIG. 7 is a sectional view taken along the line VII—VII in FIG. 3.
Figure 6:
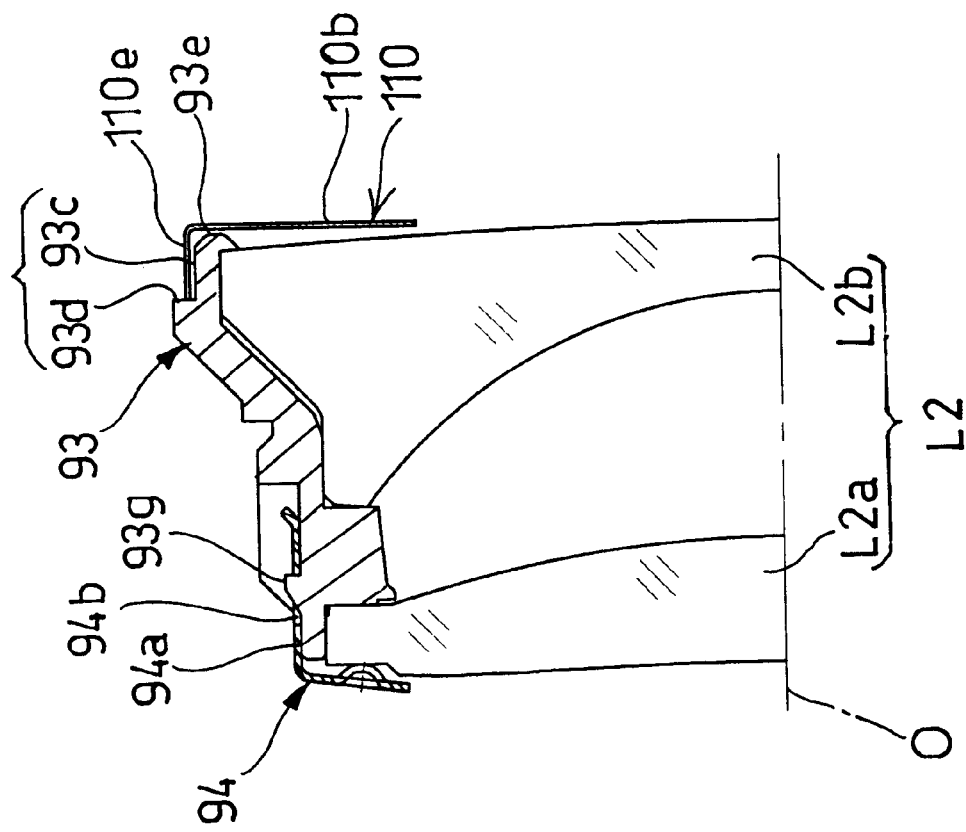
FIG. 6 is a sectional view taken along the line VI—VI in FIG. 3.

In FIG. 10, the second lens group L2 is shown generally as a single lens for clarity. In practice, the second lens group L2 includes a first lens element L2a and a second lens element L2b as shown in FIGS. 6 and 7.

The first lens element L2a is secured to the front end of the rear lens group support cylinder 93 via an annular resilient retainer 94 made of a metal thin plate. The rear lens group support cylinder 93 is provided, on the outer peripheral surface at the front end thereof, with three radially and outwardly extending engagement pawls 93g that are spaced at a substantially equal angular distance. The retainer plate 94 is provided with three leg portions 94a (only one of which is shown in FIG. 6) that extend rearward from the peripheral edge of the retainer plate and are circumferentially spaced at a substantially equal angular distance. The legs 94a are each provided with an engagement hole 94b in which a corresponding engagement pawl 93g is engaged. Namely, the first lens element L2a is secured to the front end of the rear lens group support cylinder 93 through the retainer 94 by engaging the engagement pawls 93g in the corresponding engagement holes 94b.

The second lens element L2b is secured to the rear end of the rear lens group support cylinder 93. The rear lens group support cylinder 93 has a rear end face 93e which is formed by thermally caulking the rear end of the rear lens group support cylinder 93 after the second lens element L2b is fitted therein from the rear side of the rear lens group support cylinder 93. Namely, the second lens element L2b is fitted in the rear lens group support cylinder 93 and is thereafter secured thereto by thermally caulking the rear end of the rear lens group support cylinder 93.

Figure 1:
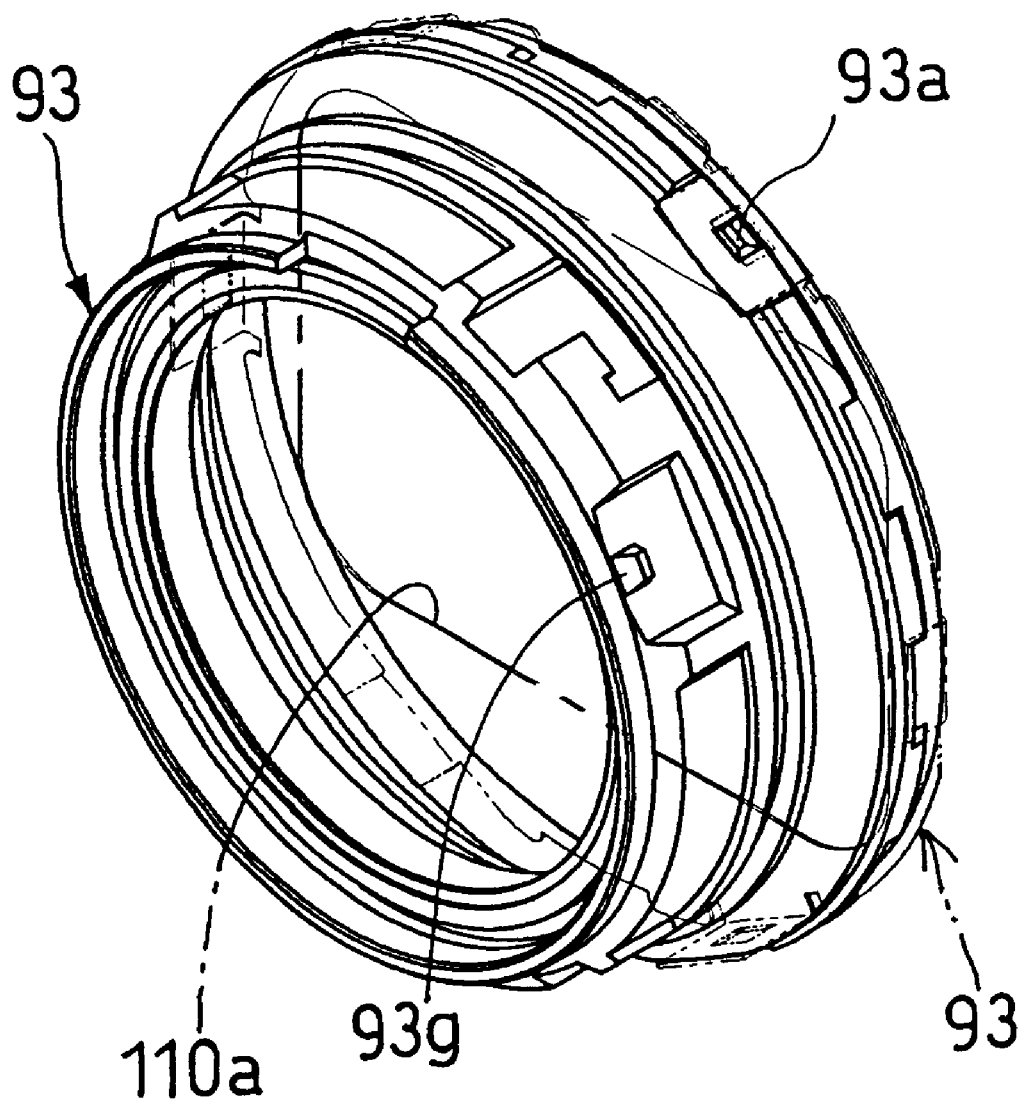
FIG. 1 is a perspective view of a rear lens group support cylinder to which a light interception frame is mounted.
Figure 2:
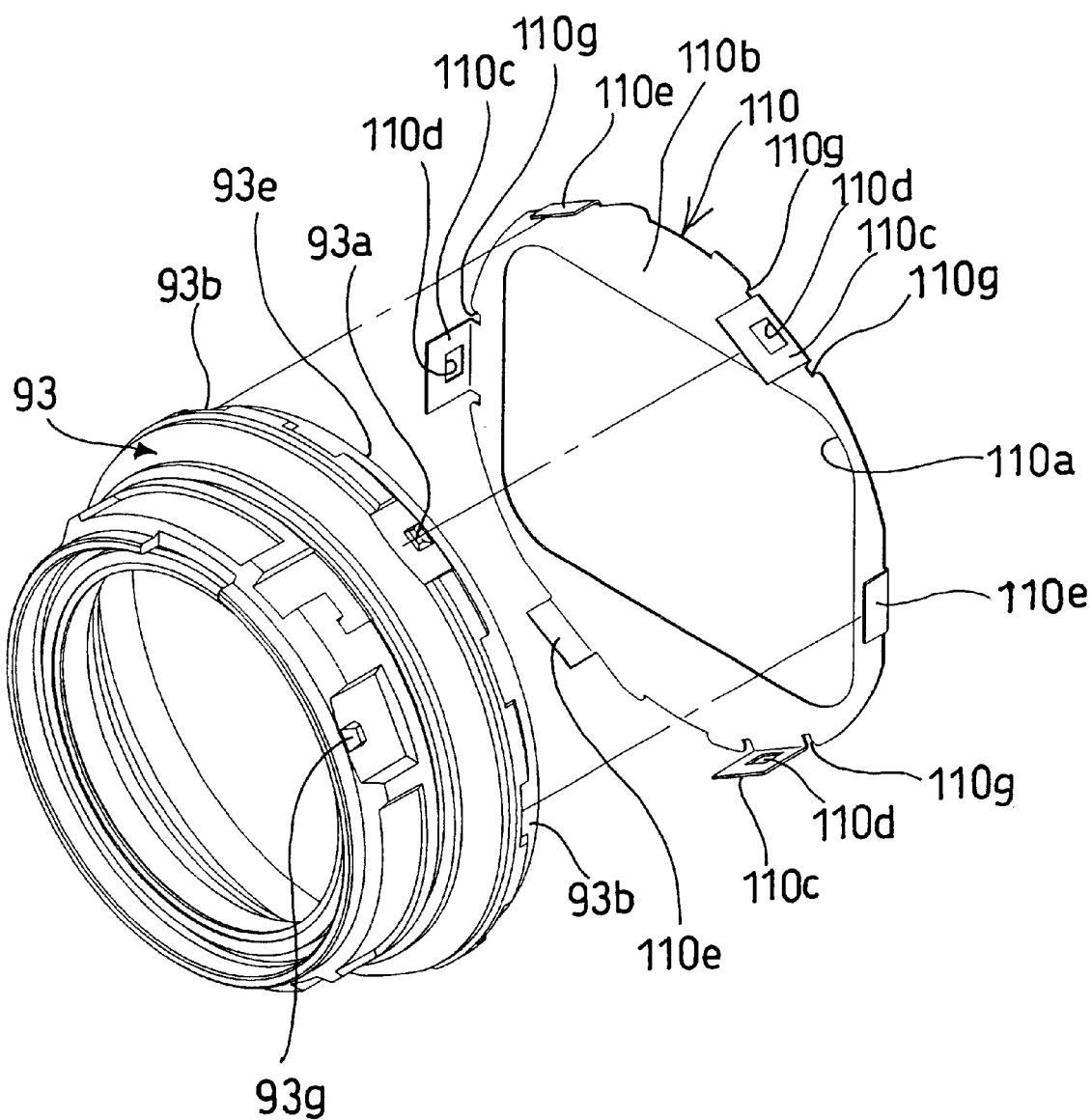
FIG. 2 is an exploded perspective view of a light interception frame and a rear lens group support cylinder.
Figure 3:
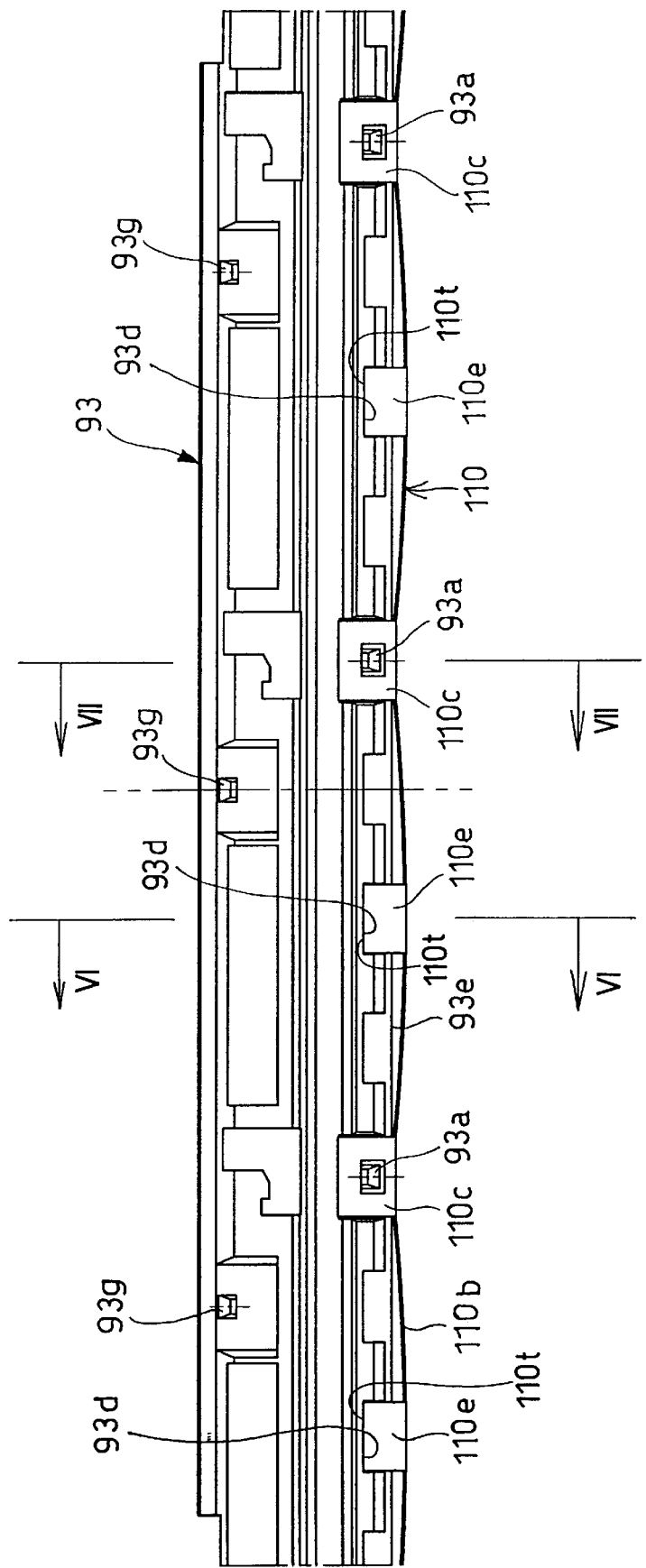
FIG. 3 is a developed view of a rear lens group support cylinder to which a light interception frame is mounted.
Figure 5:
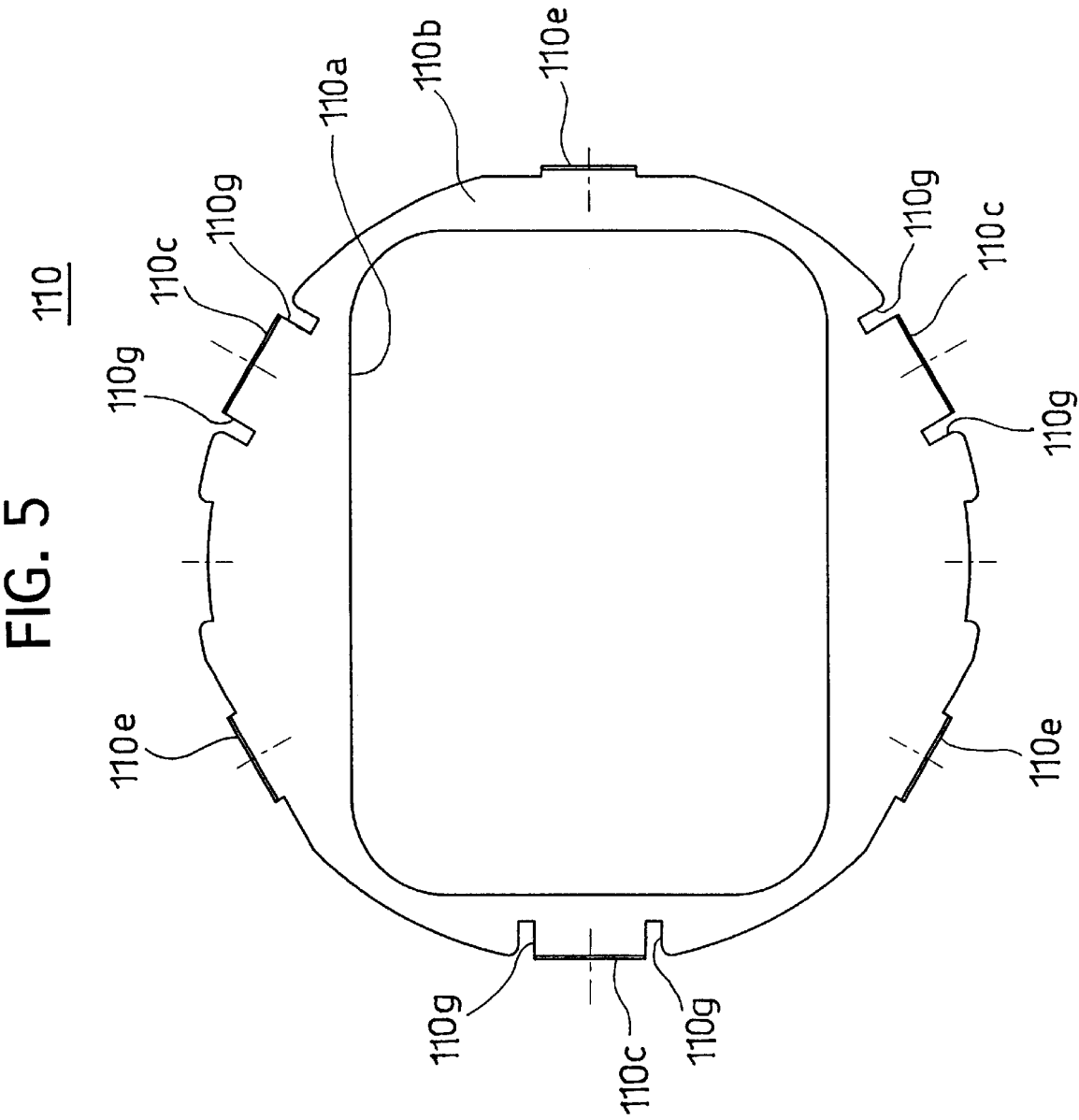
FIG. 5 is a front elevational view of a light interception frame, viewed from the front in an optical axis direction.

The resilient annular light interception frame 110 made of a metal thin plate is mounted to the rear end of the rear lens group support cylinder 93. FIG. 1 shows a perspective view of the rear lens group support cylinder 93 to which the light interception frame 110 is mounted. FIG. 2 shows an exploded perspective view of the rear lens group support cylinder 93 and the light interception frame 110 removed therefrom. FIG. 3 shows a developed view of the rear lens group support cylinder 93 to which the light interception frame 110 is mounted. FIG. 4 is a developed view of the rear lens group support cylinder 93 and the light interception frame 110 removed therefrom. FIG. 5 is a front elevational view of the light interception frame 110 viewed from the front in the optical axis direction.

The light interception frame 110 is provided with a light interception plate portion 110b which has a generally rectangular opening 110a and which lies in a plane substantially perpendicular to the optical axis O. The light interception plate portion 110b intercepts extraneous light, emitted from the rear end surface of the second lens group L2, which has adverse effects on the exposure of a photographic image.

As shown in FIG. 7, the rear lens group support cylinder 93 is provided, on the outer peripheral surface at the rear end thereof, with three radially and outwardly projecting engagement pawls (engagement projections extending in a direction substantially perpendicular to the optical axis O) 93a that are spaced from one another at a substantially equal distance. The light interception frame 110 is provided with three engagement legs 110c which extend from the peripheral edge thereof in the forward direction and which are circumferentially spaced from one another at a substantially identical angular distance. The engagement pawls 93a are engaged in corresponding engagement holes 110d formed in the engagement legs 110c.

Furthermore, the rear lens group support cylinder 93 is provided, on the outer peripheral surface at the rear end thereof, with engagement recesses 93b (see FIG. 6) which are located between two circumferentially adjacent engagement pawls 93a and which are recessed radially and inwardly. The light interception frame 110 is provided integrally with forwardly extending engagement pieces 110e which are located between two circumferentially adjacent engagement legs 110c. The engagement pieces 110e are engaged in the corresponding engagement recesses (stepped portions) 93b.

As can be seen in FIG. 6, the engagement recesses 93b are each provided with a guide surface 93c which lies in a plane substantially parallel with the optical axis O and a corresponding engagement surface (i.e., a surface substantially perpendicular to the optical axis O) 93d which extends in the radial and outward direction from the front end of the guide surface 93c (left end of the guide surface 93c as shown in FIG. 6). The engagement pieces 110e are elastically in contact at the front ends 110t (see FIGS. 3 and 4) thereof with the engagement surfaces 93d. The engagement projections 93a, the engagement surfaces 93d, the engagement legs 110c, and the engagement pieces 110e constitute a securing device for the light interception frame 110.

The length of each engagement piece 110e of the light interception frame 110 and the length of each engagement recess 93b of the rear lens group support cylinder 93, in the optical axis direction, are preset so as to meet predetermined requirements. Namely, the distance D3 between the front end 110f of the engagement hole 110d and the front end 110t of the engagement piece 110e in the optical axis direction in a free state of the light interception frame 110 (shown in FIG. 4) is smaller than the axial distance D4 between the front end (engagement end) 93f of the engagement pawl 93a and the engagement surface 93d (i.e., D3<D4). Namely, the positional relationship between the engagement pawls 93a and the engagement legs 110c, and the positional relationship between the engagement surfaces 93d and the engagement pieces 110e in the optical axis direction is such that when the engagement pieces 110e abut against the engagement surfaces 93d in the free state of the light interception frame 110, no engagement of the engagement legs 110c with the engagement pawls 93a occurs, so that the engagement legs 110c can only be engaged by the engagement pawls 93a by elastically deforming the light interception frame 110. Therefore, when the light interception frame 110 is mounted to the rear lens group support cylinder 93, the light interception frame 110 is elastically deformed with respect to the rear lens group support cylinder 93, as shown in FIG. 3. The engagement legs 110c which are engaged with the engagement pawls 93a due to the elastic force are biased rearward in the optical axis direction, and hence, even if the rear end face 93e formed by the thermal caulking is not brought into elastic contact with the light interception frame 110 which is mounted to the rear lens group support cylinder 93, the light interception frame 110 cannot be slipped off from the rear lens group support cylinder 93. When the light interception frame 110 is secured to the rear lens group support cylinder 93, the light interception plate portion 110b is opposed to the rear end face 93e, which has been formed by thermal caulking, of the rear lens group support cylinder 93.

The light interception frame 110 is also provided with cut-away portions 110g (FIG. 5) which extend in the radial and inward direction and which are located on opposite sides of the engagement legs 110c in the circumferential direction at the end of the engagement legs 110c (i.e., the end thereof connected to the light interception plate portion 110b). The radial length of the cut-away portions 110g is longer than the length necessary to form the engagement legs 110c on the light interception frame 110, so that the engagement legs 110c can be easily elastically deformed.

Figure 8:
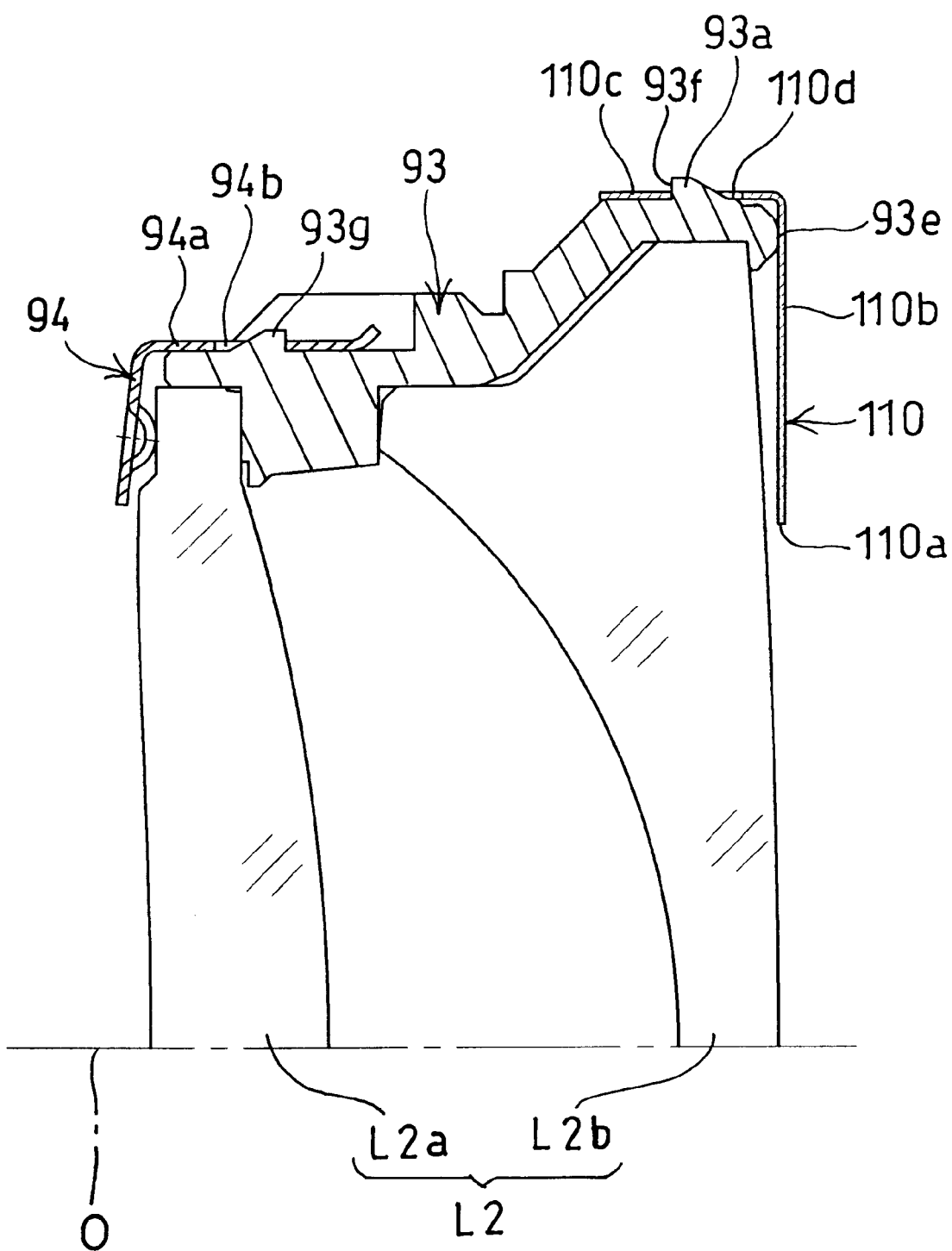
FIG. 8 is a sectional view of a light interception frame shown in FIG. 5, with a light interception plate portion abutting against a rear end face of a rear lens group support cylinder without being elastically deformed along the rear end face.
Figure 9:
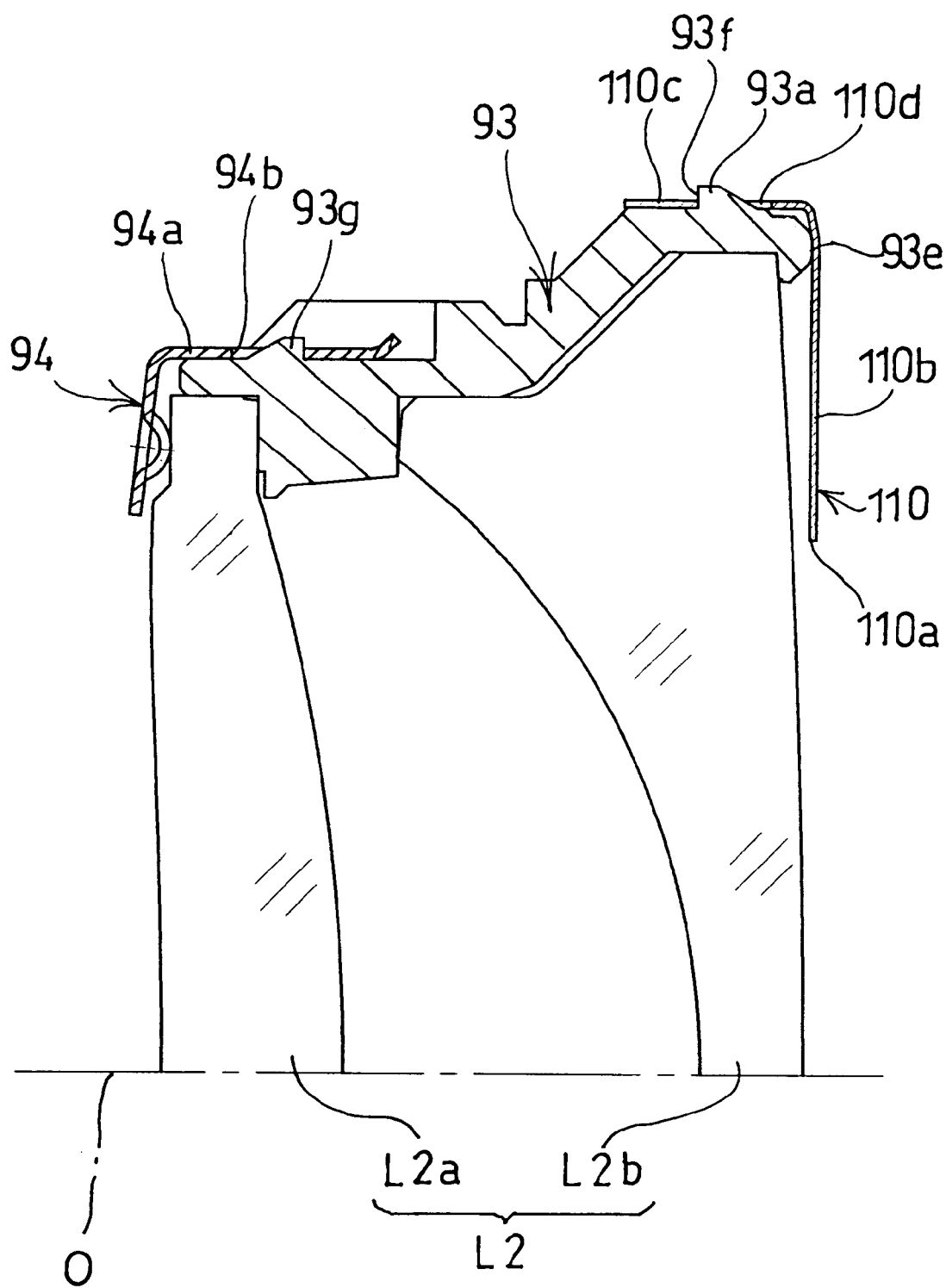
FIG. 9 is a sectional view of a light interception frame, with a light interception plate portion being elastically deformed along a rear end face of a rear lens group support cylinder, so that the amount of projection of the rear end face is larger than that shown in FIG. 8.

Since the shape of the rear end face 93e of the rear lens group support cylinder 93 is not formed in an exact manner for the reasons mentioned above, it is possible to consider intentionally providing a clearance between the rear end face 93e of the rear lens group support cylinder 93 and the light interception plate portion 110b, in view of a possible increase in the amount of projection of the rear end face 93e in the rearward direction of the optical axis. However, such a clearance increases the size of the zoom lens barrel 10, contrary to the miniaturization thereof. Since, the engagement legs 110c are provided with the radially extending cut-away portions 110g that contribute to an easy elastic deformation thereof, in the illustrated embodiment in which no clearance is provided between the rear end face 93e and the light interception plate portion 110b, even if the amount of rearward projection of the rear end face 93e of the rear lens group support cylinder 93 in the optical axis direction is large, the size of the zoom lens barrel 10 is not increased, due to the elastic deformation of the engagement legs 110c along the shape of the rear end face 93e. Consequently, the zoom lens barrel 10 in the illustrated embodiment can be made small due to an absence of the clearance between the rear end face 93e and the light interception plate portion 110b. In FIG. 8, the light interception plate portion 110b is in contact with the rear end face 93e but is not deformed along the rear end face 93e. In FIG. 9 in which the amount of rearward projection of the rear end face 93e in the axial direction is greater than that shown in FIG. 8, the light interception plate portion 110b is elastically deformed along the rear end face 93e.

The number of the engagement pawls 93a and the engagement legs 110c, the number of the engagement recesses (stepped portions) 93b and the engagement pieces 110e are not limited to those in the illustrated embodiment. Moreover, the material of the light interception frame 110 is not limited to a metal sheet and can be any resilient material which does not permit light to pass therethrough.

Although the securing device for the light interception frame is mounted to the zoom lens barrel 10 formed integrally with the lens shutter type camera, in the illustrated embodiment, the present invention is not limited thereto, and can be used for a zoom lens barrel of a digital camera or a lens barrel having no zooming function.

As can be understood from the above discussion, in a securing device for a light interception frame according to the present invention, since the positional relationship between a plurality of engagement projections and a plurality of engagement legs and between a plurality of engagement surfaces and a plurality of engagement pieces in a direction parallel with the optical axis is set so that when the engagement pieces engage with the engagement surfaces in a free state of the light interception frame, no engagement of the engagement legs with the engagement projections occurs, and that the engagement legs can be engaged by the engagement projections by elastically deforming the light interception frame, the dimension and shape of the lens frame portion to which the light interception frame is mounted does not need to be regulated. Consequently, the light interception frame can always be reliably mounted to the lens frame.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A securing device for securing a light interception frame made of a resilient material to an end face of a lens frame which holds a lens, in which:
    said lens frame is provided on the peripheral surface thereof with a plurality of engagement projections which extend in a direction substantially perpendicular to an optical axis of the lens, and a plurality of engagement surfaces which are located between the engagement projections and lie in a plane substantially perpendicular to the lens axis;
    said light interception frame including a light interception plate portion that has an opening through which light can pass and that lies in a plane substantially perpendicular to the lens axis; a plurality of engagement legs that extend from the outer peripheral edge of the light interception plate portion and that engage with the corresponding engagement projections; and a plurality of engagement pieces that extend from the outer peripheral edge of the light interception plate portion and abut against the corresponding engagement surfaces;
    wherein the positional relationship between the plurality of engagement projections and the plurality of engagement legs, and the positional relationship between the plurality of engagement surfaces and the plurality of engagement pieces are such that when the engagement pieces engage with the engagement surfaces in a free state of the light interception frame, no engagement of the engagement legs with the engagement projections occurs, and the engagement legs are engaged with the engagement projections by elastically deforming the light interception frame.

2. The securing device for a light interception frame according to claim 1, wherein said engagement legs are provided with engagement holes in which the corresponding engagement projections are engaged.

3. The securing device for a light interception frame according to claim 1, wherein said lens held by the lens frame is secured to the lens frame by thermally caulking the end face of the lens frame after the lens is fitted in the lens frame from the end face side; wherein
    said light interception frame is secured to the lens frame by said securing device, wherein the light interception plate portion is opposed to said end face of said lens frame that has been subject to said thermal caulking.

4. The securing device for a light interception frame according to claim 1, wherein said light interception plate portion is provided, on the end portions of the engagement legs which connect to said light interception plate portion, with cut-away portions so as to facilitate elastic deformation of the engagement legs.

5. A light intercepting device for a lens, comprising:
    a lens frame which holds a lens, said lens frame being provided on the peripheral surface thereof with a plurality of engagement projections which extend in a direction substantially perpendicular to an optical axis of the lens, and a plurality of engagement surfaces which are located between the engagement projections, said engagement surface lying in a plane substantially perpendicular to the lens axis; and
    a light interception frame made of a resilient material, said light interception frame being provided with a light interception plate portion that has an opening through which light can pass and lies in a plane substantially perpendicular to the lens axis, a plurality of engagement legs that extend from the outer peripheral edge of the light interception plate portion and engage with corresponding said engagement projections, and a plurality of engagement pieces that extend from the outer peripheral edge of the light interception plate portion and abut against corresponding said engagement surfaces;
    wherein said light interception frame is secured to an end face of said lens frame so that the engagement legs are engaged with the engagement projections by elastically deforming the light interception frame when the engagement legs are engaged with the engagement projections.

6. The light intercepting device for a lens to claim 5, wherein said engagement legs are provided with engagement holes in which the corresponding engagement projections are engaged.

7. The light intercepting device for a lens according to claim 5, wherein said lens held by said lens frame is secured to said lens frame by thermally caulking the end face of said lens frame after the lens is fitted in said lens frame from the end face side; wherein
    said light interception frame is secured to said lens frame, wherein the light interception plate portion is opposed to said end face of said lens frame that has been subject to the thermal caulking.

8. The light intercepting device for a lens according to claim 5, wherein said light interception plate portion is provided, on the end portions of the engagement legs which connect to said light interception plate portion, with cut-away portions so as to facilitate elastic deformation of the engagement legs.

9. A securing device for securing a light interception frame made of a resilient material to an end face of a lens frame which holds a lens, comprising:

a plurality of engagement projections and a plurality of engagement surfaces provided on the peripheral surface of said lens frame, said plurality of engagement projections extending in a direction substantially perpendicular to an optical axis of the lens, and said plurality of engagement surfaces being located between the engagement projections and lying in a plane substantially perpendicular to the lens axis; and a plurality of engagement legs and a plurality of engagement pieces provided on said light interception frame having a light interception plate portion, said plurality of engagement legs extending from the outer peripheral edge of the light interception plate portion and engaging with corresponding said engagement projections, said plurality of engagement pieces extending from the outer peripheral edge of the light interception plate portion and abutting against corresponding said engagement surfaces; wherein said light interception plate portion lies in a plane substantially perpendicular to the lens axis and has an opening through which light can pass;

wherein the positional relationship between the plurality of engagement projections and the plurality of engagement legs, and the positional relationship between the plurality of engagement surfaces and the plurality of engagement pieces are such that when the engagement pieces engage with the engagement surfaces in a free state of the light interception frame, no engagement of the engagement legs with the engagement projections occurs, and the engagement legs are engaged by the engagement projections by elastically deforming the light interception frame.

* * * * *